United States Patent
Lin

(10) Patent No.: US 12,167,810 B2
(45) Date of Patent: Dec. 17, 2024

(54) FOOD HEATING DEVICE AND FOOD HEATING METHOD USING THE SAME

(71) Applicant: YO-KAI EXPRESS INC., Sunnyvale, CA (US)

(72) Inventor: Chih Hung Lin, San Jose, CA (US)

(73) Assignee: YO-KAI EXPRESS INC., Sunnyvale, CA (US)

( * ) Notice: Subject to any disclaimer, the term of this patent is extended or adjusted under 35 U.S.C. 154(b) by 402 days.

(21) Appl. No.: 16/997,272

(22) Filed: Aug. 19, 2020

(65) Prior Publication Data

US 2021/0052101 A1 Feb. 25, 2021

Related U.S. Application Data

(60) Provisional application No. 62/889,164, filed on Aug. 20, 2019.

(51) Int. Cl.
*A47J 27/04* (2006.01)
*A47J 27/62* (2006.01)

(52) U.S. Cl.
CPC .............. *A47J 27/04* (2013.01); *A47J 27/62* (2013.01); *A47J 2027/043* (2013.01)

(58) Field of Classification Search
CPC ....... A47J 27/04; A47J 27/62; A47J 2027/043
See application file for complete search history.

(56) References Cited

U.S. PATENT DOCUMENTS

| | | | |
|---|---|---|---|
| 2,263,473 A | 11/1941 | Rogers | |
| 4,655,192 A * | 4/1987 | Jovanovic | F24C 15/327 |
| | | | 126/369 |
| 4,906,485 A * | 3/1990 | Kirchhoff | A21B 5/00 |
| | | | 126/369 |
| 4,906,486 A | 3/1990 | Young | |
| 5,156,082 A * | 10/1992 | Fukuda | G05D 23/1951 |
| | | | 99/403 |

(Continued)

FOREIGN PATENT DOCUMENTS

| | | | | |
|---|---|---|---|---|
| TW | M591819 U | 3/2020 | | |
| WO | WO-2016062513 A1 * | 4/2016 | | A21B 1/26 |

OTHER PUBLICATIONS

International Search Report and Written Opinion of the International Searching Authority for International Application No. PCT/US 20/46977 dated Jan. 21, 2021.

*Primary Examiner* — Steven N Leff
(74) *Attorney, Agent, or Firm* — Birch, Stewart, Kolasch & Birch, LLP

(57) ABSTRACT

A food heating device and a food heating method are provided. The food heating device includes a placement device and a heating device. The placement device includes a casing and a placement board. The placement board is disposed in the casing and is configured to place a food item. The heating device includes a steam portion, a hot water portion and an injection member. The steam portion and the hot water portion are in communication with the injection member, the injection member passes through the casing and is movably provided corresponding to the placement board, and the steam portion and the hot water portion are configured to inject steam and hot water into the food item on the placement board through the injection member so as to heat the food item.

12 Claims, 8 Drawing Sheets

(56) References Cited

U.S. PATENT DOCUMENTS

| | | | | |
|---|---|---|---|---|
| 5,968,574 | A * | 10/1999 | Sann | A47J 27/16 126/369 |
| 6,419,971 | B1 | 7/2002 | Mather et al. | |
| 7,069,840 | B1 | 7/2006 | Howard | |
| 7,404,519 | B2 * | 7/2008 | Jeon | H05B 6/6441 235/462.43 |
| 7,638,736 | B2 * | 12/2009 | Adamczak | A47J 27/16 219/403 |
| 8,997,638 | B2 * | 4/2015 | Park | F24C 15/003 126/369 |
| 9,149,058 | B2 * | 10/2015 | Bilet | A47J 27/16 |
| 10,149,486 | B2 | 12/2018 | Högnason et al. | |
| 2005/0174022 | A1 | 8/2005 | Kuttalek | |
| 2014/0137857 | A1 * | 5/2014 | Kwag | A47J 27/04 126/369 |
| 2017/0105567 | A1 | 4/2017 | Voit et al. | |

* cited by examiner

FOOD HEATING DEVICE AND FOOD HEATING METHOD USING THE SAME

CROSS REFERENCE

This Non-provisional application claims the priority under 35 U.S.C. § 119(a) on U.S. Patent Provisional Application No. 62/889,164 filed on Aug. 20, 2019, the entire contents of which are hereby incorporated by reference.

FIELD OF THE INVENTION

The present invention generally relates to the food heating technology and, more particularly, to a food heating device and a food heating method using the food heating device.

BACKGROUND OF THE INVENTION

Current food heating devices include microwaves, ovens, steamers and electric cookers. These food heating devices are respectively suitable for certain types and ranges of foods, but at the same time have limitations. For example, it would not be appropriate to heat frozen foods such as noodles and thick soups by current food heating devices, and these frozen foods would be better properly heated by a conventional manual cooking procedure.

SUMMARY OF THE INVENTION

In view of the above, one object of the present invention is to provide a food heating device, which is suitable for more types of foods to be heated and capable of enhancing heating efficiency without involving manual effort in a heating process.

One object of the present invention is to provide a food heating method, which is suitable for more types of foods to be heated and capable of enhancing heating efficiency without involving manual effort in a heating process.

To achieve the foregoing objects, in one aspect of the present invention, a food heating device includes a placement device and a heating device. The placement device includes a casing and a placement board. The placement board is disposed in the casing, and is configured to place a food item. The heating device includes a steam portion, a hot water portion and an injection member. The steam portion and the hot water portion are in communication with the injection member, the injection member passes through the casing and is movably provided corresponding to the placement board, and the steam portion and the hot water portion are configured to inject steam and hot water into the food item on the placement board through the injection member so as to heat the food item.

In one embodiment of the present invention, the food heating device further includes a movement device, wherein the movement device includes a sliding block and a sliding shaft. The sliding block is movably provided on the sliding shaft, and the injection member is connected to the sliding block.

In one embodiment of the present invention, the movement device further includes a clamping member. The clamping member is fixed on the sliding block, and clamps the injection member.

In one embodiment of the present invention, the movement device further includes a fixing base. The fixing base is fixed on the casing, and the injection member movably passes through the fixing base and the casing.

In one embodiment of the present invention, the placement device further includes a door panel and a driving shaft. The driving shaft is connected to the door panel, and is configured to move the door panel.

In one embodiment of the present invention, the placement board is fixed on the door panel, and the driving shaft is configured to move the door panel and driving the placement board to move out of or move into the casing.

In one embodiment of the present invention, the placement board includes a hollow region and a frame. The frame encircles the hollow region, the hollow region is configured to allow a food item to pass through, and the frame is configured to support the food item.

In one embodiment of the present invention, the placement device further includes a bottom plate. The bottom plate is fixed in the casing, and includes a plurality of slot openings.

In one embodiment of the present invention, the food heating device further includes an air extraction device. The air extraction device is provided on the casing, and is in communication with the interior of the casing.

In one embodiment of the present invention, the food heating device further includes a control module and a scanning device. The control module is signally connected to the scanning device and the heating device, and the scanning device is configured to read information associated with the food item.

In another aspect of the present invention, a food heating method includes the following steps. First, a placement board is moved out from a casing of a placement device such that the placement board is exposed. Then, a food item is placed on the placement board being exposed. Next, the placement board is moved back into the casing such that the placement board is enclosed. At last, steam is injected by a steam portion and hot water is injected by a hot water portion into the food item on the placement board through an injection member of a heating device so as to heat the food item. The steam portion and the hot water portion are in communication with the injection member. The injection member passes through the casing and is movably provided corresponding to the placement board.

In one embodiment of the present invention, heating information associated with the food item is read by a scanning device signally connected to a control module being configured to control the steam portion and the hot water portion of the heating device according to the heating information.

In one embodiment of the present invention, the heating information includes injection time points, duration, temperature ranges of steam and hot water, or a combination thereof.

In one embodiment of the present invention, the injection member is driven such that the injection member moves downwards and passes through the casing to further insert into the food item. Steam and hot water are simultaneously or sequentially generated, and simultaneously or sequentially injected into the interior of the food item through the injection member so as to heat the food in the interior of the food item.

In one embodiment of the present invention, the injection member moves up and down to disperse steam, hot water, or a combination thereof more uniform in the food item.

In conclusion, the food heating device and the food heating method according to the embodiments of the present invention, by heating food to be heated by steam and hot water, are suitable for more types of food to be heated, and are capable of enhancing heating efficiency without involving manual effort in a heating process.

Detailed features and advantages of the present invention are described in detail by way of embodiments below. The disclosure of the embodiments are sufficient for a person skilled in the art to understand the technical content of the present invention and accordingly implement the present invention. In addition, on the basis of the disclosed content, claims and drawings of the description of the present application, a person skilled in the art could easily understand the objects and advantages of the present invention.

BRIEF DESCRIPTION OF THE DRAWINGS

The foregoing summary, as well as the following detailed descriptions of the invention, will be better understood when read in conjunction with the appended drawings. In the drawings.

DESCRIPTION OF THE INVENTION

The following embodiments when read with the accompanying drawings are made to clearly exhibit the above-mentioned and other technical contents, features and effects of the present disclosure. Through the exposition by means of the specific embodiments, people would further understand the technical means and effects of the present disclosure adopted to achieve the above-indicated objectives. Moreover, as the contents disclosed herein can be readily understood and implemented by a person skilled in the art, all equivalent changes or modifications which do not depart from the concept of the present disclosure shall be encompassed by the appended claims.

Furthermore, the ordinals recited in the specification and the claims such as "first", "second" and so on are intended only to describe the elements claimed and imply or represent neither that the claimed elements have any proceeding ordinals, nor the sequence between one claimed element and another claimed element or between steps of a manufacturing method. The use of these ordinals is merely to differentiate one claimed element having a certain designation from another claimed element having the same designation.

Furthermore, the terms recited in the specifications and the claims such as "above", "over", or "on" are intended not only directly contact with the other element, but also intended indirectly contact with the other element.

Figure 1:
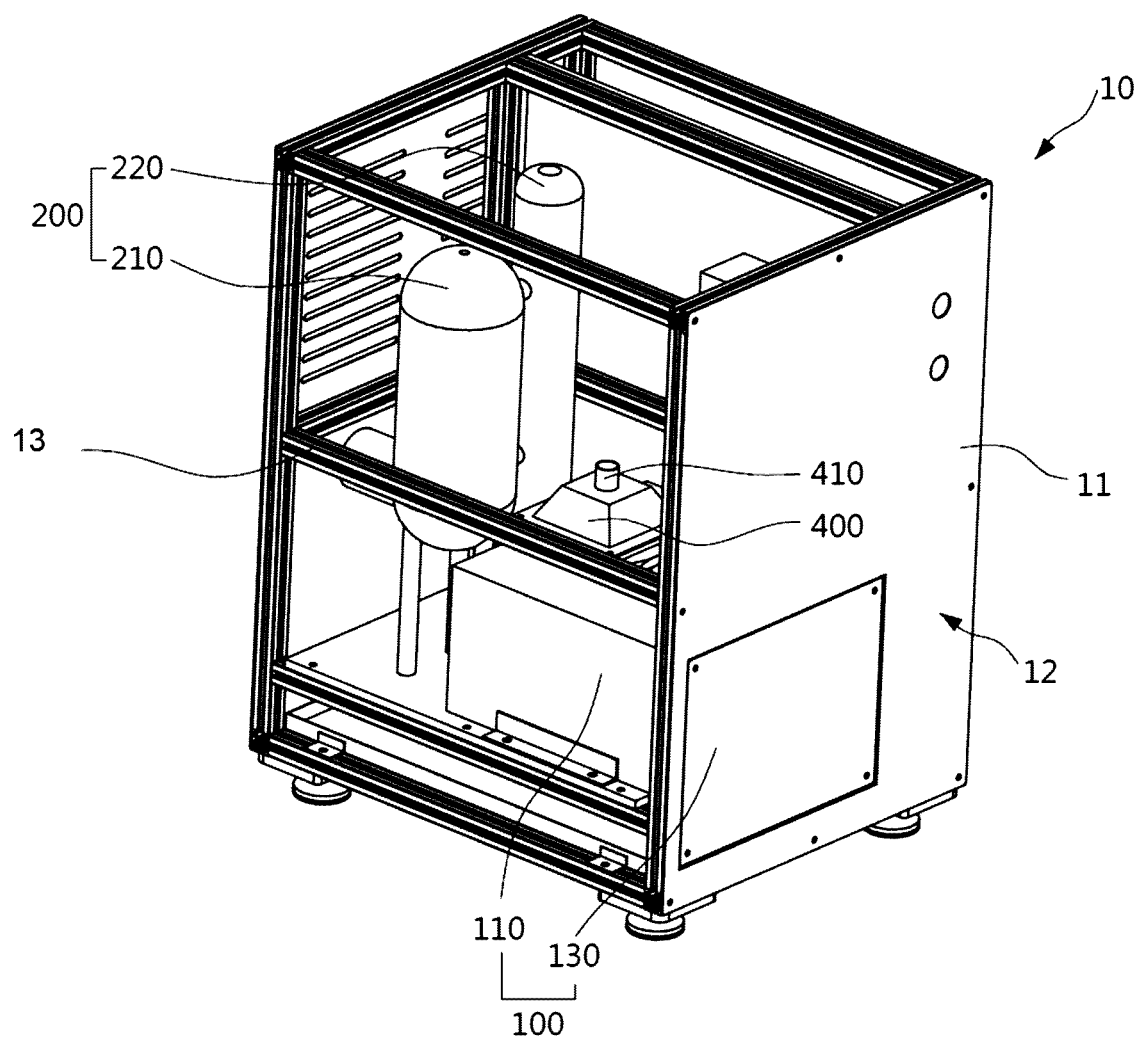
FIG. 1 is a schematic diagram of a food heating device according to one embodiment of the present invention.

Referring to FIG. 1, FIG. 1 shows a schematic diagram of a food heating device 10 according to one embodiment of the present invention. In this embodiment, the food heating device 10 can be, for example but not limited to, a table top device that can be placed on a tabletop or an appropriate top. The food heating device 10 includes a housing 11, a placement device 100 and a heating device 200. The placement device 100 and the heating device 200 are primarily disposed in the housing 11. The placement device 100 can be configured to place food to be heated, and the heating device 200 can be configured to heat food in the placement device 100, with associated details to be given later. As shown in FIG. 1, in this embodiment, the food heating device 100 further includes a front panel 12 and a support frame 13. The front panel 12 is a part of the housing 11, and the placement device 100 is disposed corresponding to the front panel 12. The support frame 13 is provided in the housing 11, and can support the housing 11 and associated elements located in the housing 11.

Figure 2:
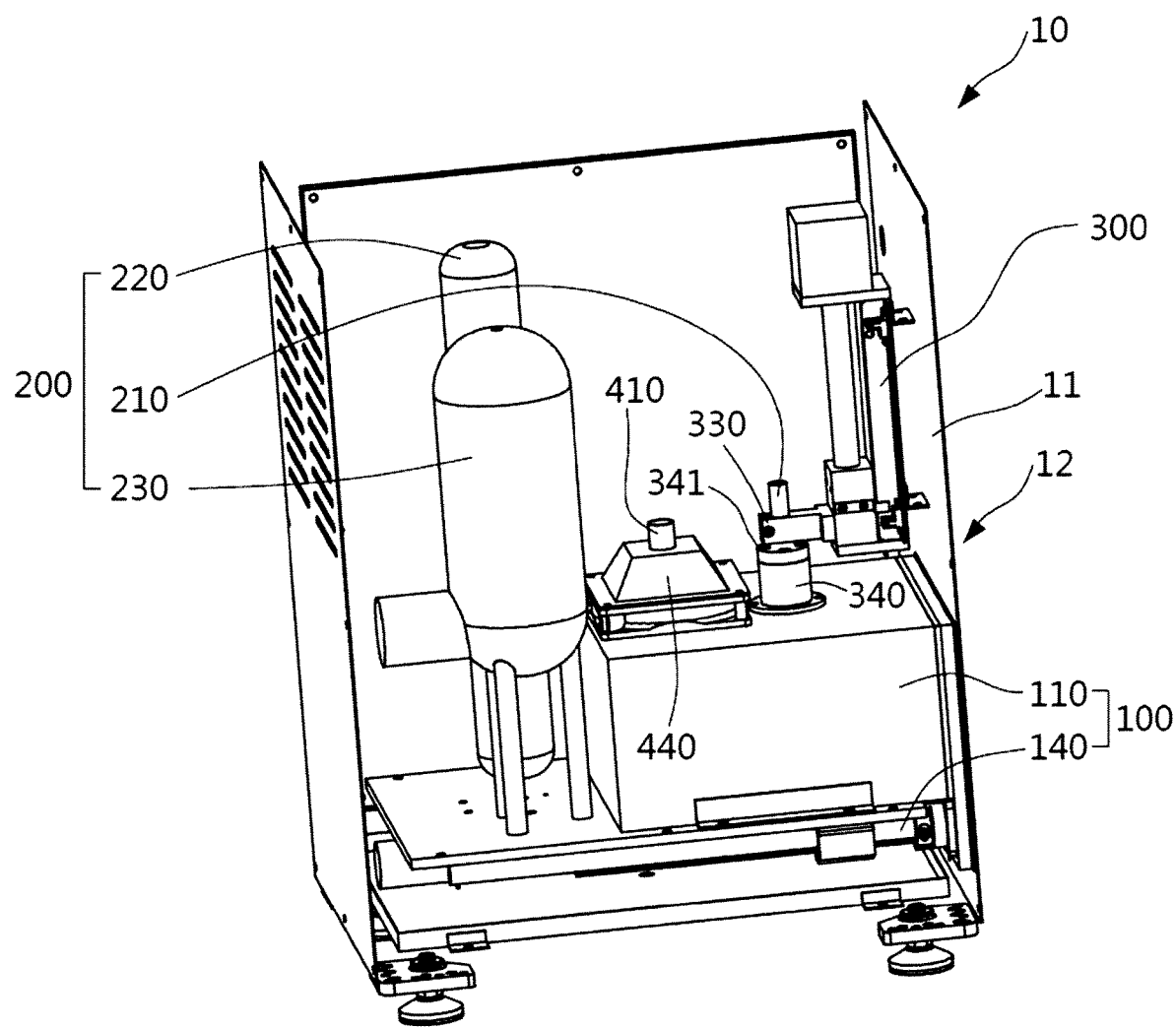
FIG. 2 is a schematic diagram of the food heating device in FIG. 1 from another angle, with a support frame being omitted to better present an internal structure thereof.

Referring to FIG. 2, FIG. 2 is a schematic diagram of the food heating device 10 in FIG. 1 from another angle, with the support frame 13 omitted to better present an internal structure thereof. As shown in FIG. 1 and FIG. 2, in this embodiment, the placement device 100 includes a casing 110; the heating device 200 includes a steam portion 210, a hot water portion 220 and an injection member 230. The steam portion 210 and the hot water portion 220 are in communication with the injection member 230, and the injection member 230 passes through the casing 110 so as to enter the casing 110. For example, the steam portion 210 and the hot water portion 220 can be individually connected to the injection member 230 through one or multiple metal tubes (not shown), steam generated by the steam portion 210 can pass through the corresponding metal tube to enter the injection member 230, the hot water generated by the hot water portion 220 can similarly pass through the corresponding metal tube to enter the injection member 230.

Figure 3:
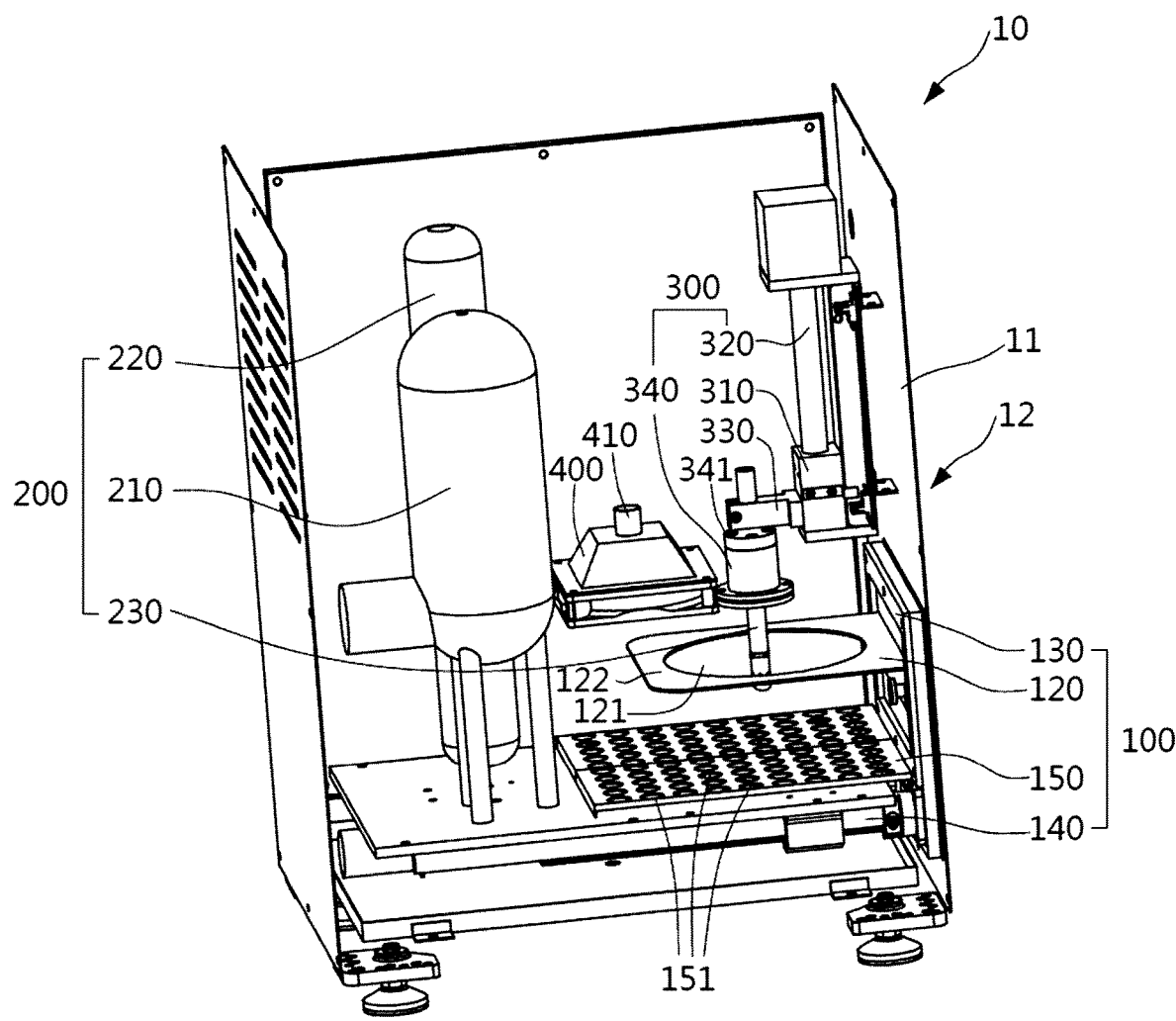
FIG. 3 is a schematic diagram of the food heating device in FIG. 2, with a casing of the placement device being omitted to better present an internal structure thereof.

Referring to FIG. 3, FIG. 3 shows a schematic diagram of the food heating device 10 in FIG. 2, with the casing 110 of the placement device 100 being omitted to better present an internal structure thereof. As shown in FIG. 1 to FIG. 3, in this embodiment, the placement device 100 further includes a placement board 120. The placement board 120 is disposed in the casing 110, and is configured to place food to be heated. The injection member 230 is configured as passing through the casing 110 and has a movement capability, and is provided corresponding to the placement board 120. For example, as observed from FIG. 3, the injection member 230 is capable of moving up and down relative to the placement board 120 in the casing 110. The steam portion 210 and the hot water portion 220 are configured to inject steam and hot water into the food to be heated through the injection member 230, so as to heat a food item 20.

As shown in FIG. 3, in this embodiment, the food heating device 10 further includes a movement device 300. The movement device 300 includes a sliding block 310 and a sliding shaft 320. The sliding block 310 is movably provided on the sliding shaft 320, and the injection member 230 is connected to the sliding block 310. For example, when the sliding block 310 moves up and down along the sliding shaft 320, the sliding block 310 drives the injection member 230 to together move up and down. In some embodiments, the sliding block 310 can be connected to a motor, and the motor can drive in response to a control instruction the sliding block 310 to move along the sliding shaft 320. Details of the motor and the connection relationship between the motor and the sliding block 310 can be implemented by known techniques and are omitted herein.

As shown in FIG. 3, in this embodiment, the movement device 300 further includes a clamping member 330. The clamping member 330 is fixed on the sliding block 310, and clamps the injection member 230. That is to say, the injection member 230 is connected to the sliding block 310 by the clamping member 330. In some embodiments, the clamping member 330 can be selectively tightened or loosened. In a normal condition, the clamping member 330 tightly clamps the injection member 230, such that, when the clamping member 330 moves with the sliding block 310 along the sliding shaft 320, the injection member 230 correspondingly moves with the clamping member 330. However, when the injection member 230 needs to be replaced, the clamping member 330 can be loosened to facilitate the replacement of the injection member 230.

As shown in FIG. 2 and FIG. 3, in this embodiment, the movement device 300 further includes a fixing base 340. The fixing base 340 is fixed on the casing 110, and includes through holes 341. The through holes 341 pass through the fixing base 340, and are aligned with the openings (not shown) on the casing 110. Thus, the injection member 230 can movably pass through the through holes 341 of the fixing base 340 and the openings on the casing 110 to enter the interior of the casing 110.

As shown in FIG. 2 and FIG. 3, in this embodiment, the placement device 100 further includes a door panel 130 and a driving shaft 140. The driving shaft 140 is connected to the door panel 130 and is configured to move the door panel 130, and the door panel 130 is provided corresponding to the front panel 12. In some embodiments, the driving shaft 140 can be connected to a motor, the motor can drive in response to a control instruction the driving shaft 140 to move, and the driving shaft 140 can drive the door panel 130 to depart from the casing 110 to the front panel 12 such that the interior of the casing 110 enters an open state, or the driving shaft 140 can drive the door panel 130 to approach and be connected to the casing 110 such that the interior of the casing 110 enters a closed state. Details of the motor and the connection relationship between the motor and the driving shaft 140 can be implemented by known techniques, and are omitted herein.

As shown in FIG. 2 and FIG. 3, in this embodiment, the placement board 120 is fixed on the door panel 130. Thus, when the driving shaft 140 is driven by the motor and hence moves the door panel 130, the movement of the door panel 130 correspondingly drives the placement board 120, such that the placement board 120 moves out of or moves into the casing 110. Further, in this embodiment, the placement board 120 includes a hollow region 121 and a frame 122. The frame 122 encircles the hollow region 121, and food to be heated can be placed on the placement board 120 by means of the hollow region 121 and the frame 122, with associated details to be given later.

Figure 4:
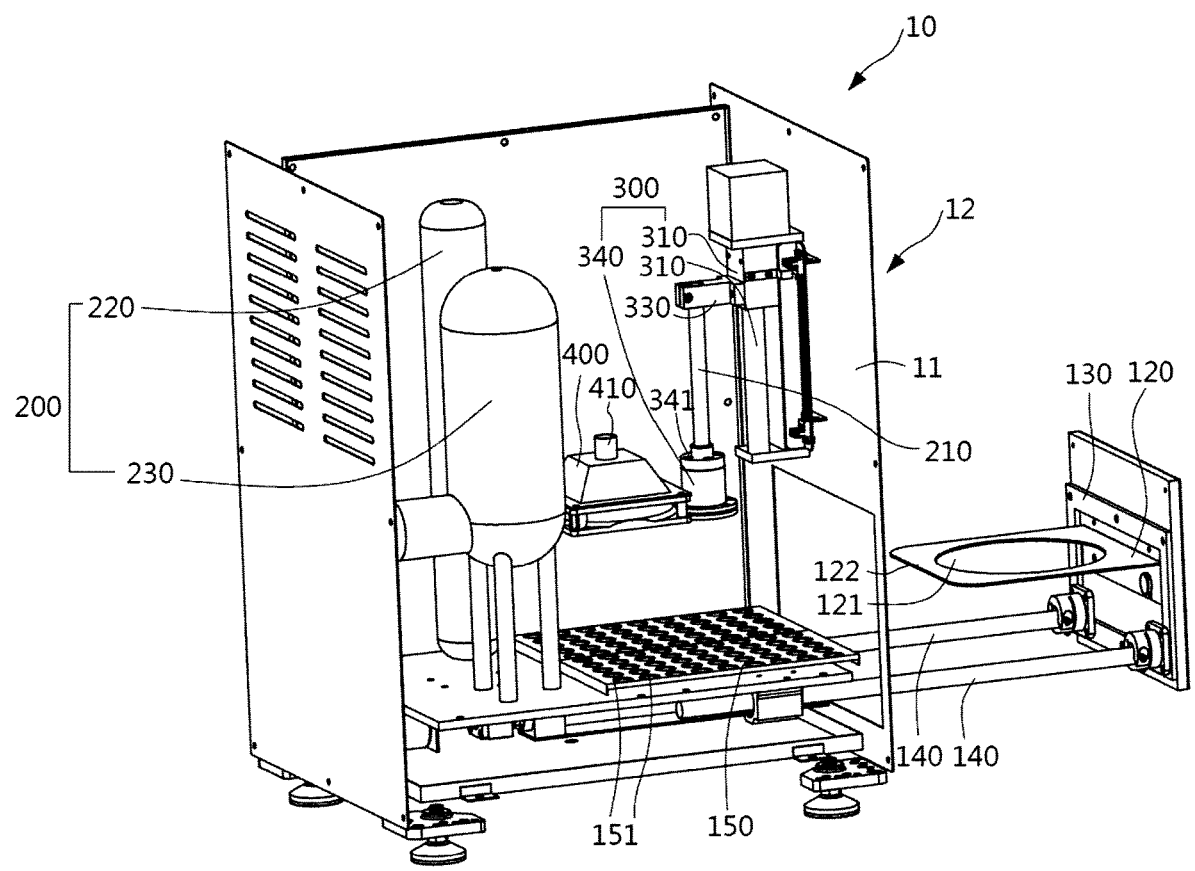
FIG. 4 is a first schematic diagram of the operation of the food heating device in FIG. 3.
Figure 5:
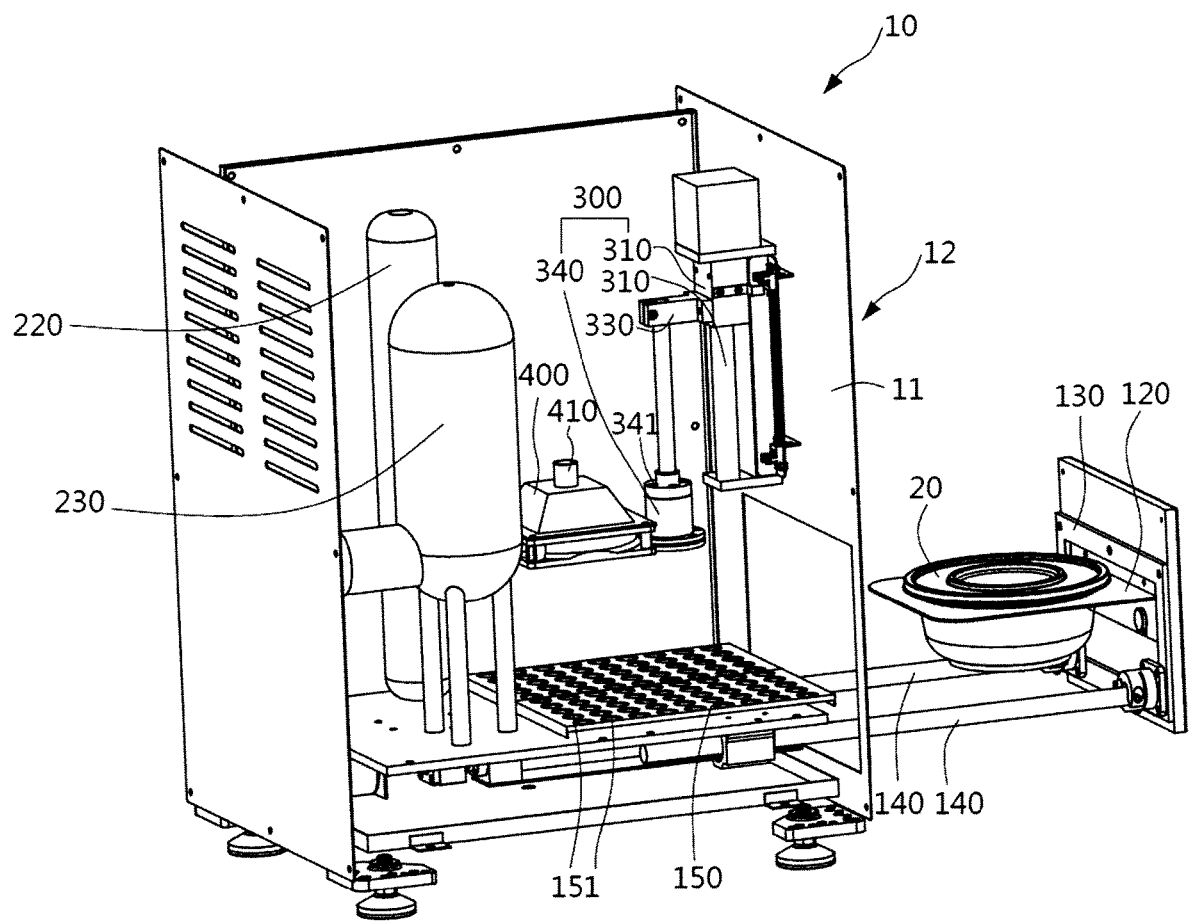
FIG. 5 is a second schematic diagram of the operation of the food heating device in FIG. 3.
Figure 6:
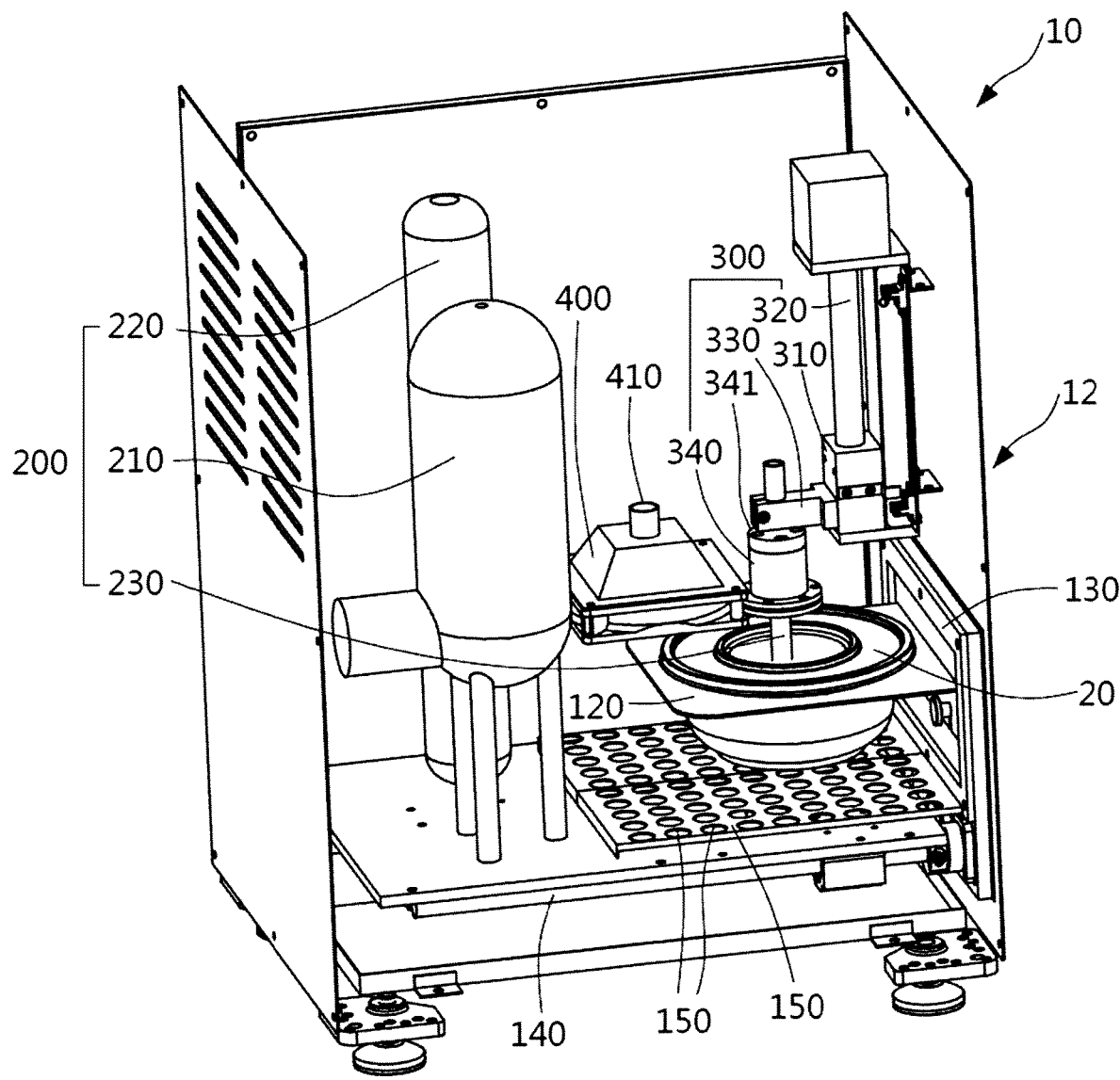
FIG. 6 is a third schematic diagram of the operation of the food heating device in FIG. 3.
Figure 7:
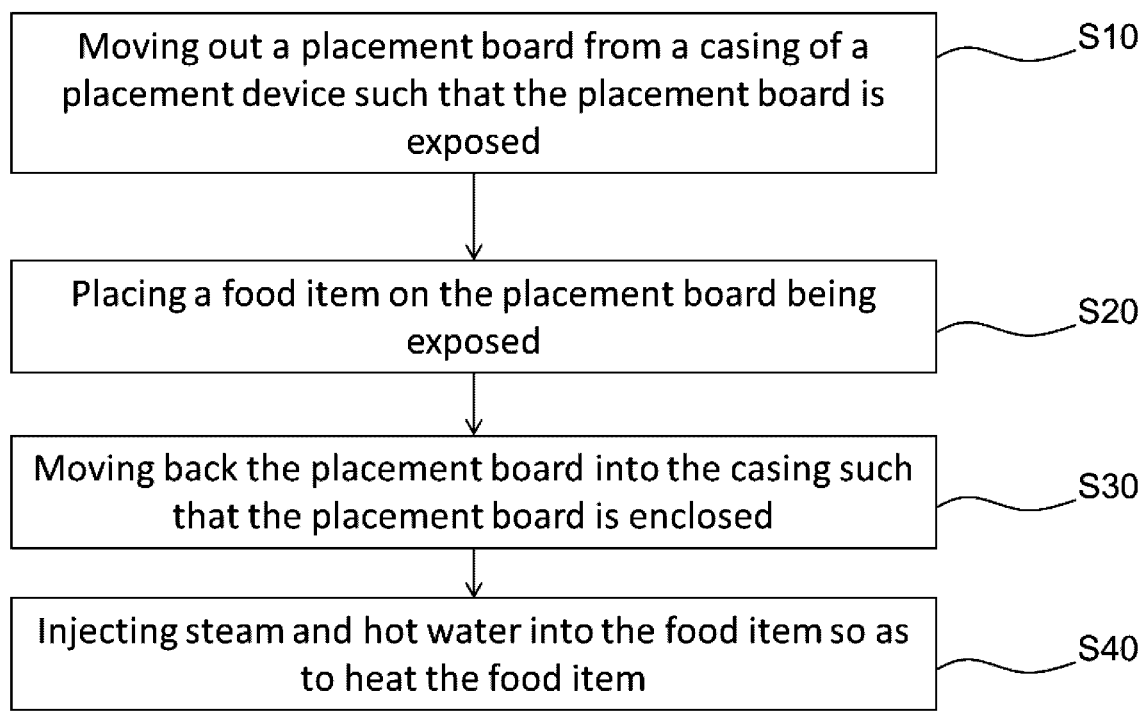
FIG. 7 is a flowchart of a food heating method according to one embodiment of the present invention.

The present invention further provides a food heating method. Referring to FIG. 4, FIG. 5, FIG. 6 and FIG. 7, FIG. 4 shows a first schematic diagram of the operation of the food heating device 10 in FIG. 3, FIG. 5 shows a second schematic diagram of the operation of the food heating device 10 in FIG. 3, FIG. 6 shows a third schematic diagram of the operation of the food heating device 10 in FIG. 3, and FIG. 7 is a flowchart of a food heating method according to one embodiment of the present invention.

The food heating method includes the following steps. First, in Step S10, when a user wishes to use the food heating device 10, a control instruction can be sent to the food heating device by, for example but not limited to, a control panel (not shown) provided on the front panel 12 or by means of remote control. In this case, as shown in FIG. 4, the driving shaft 140 drives the door panel 130 in a way that the door panel 130 moves away from the front panel 12, such that the internal space of the casing 110 enters an open state. Correspondingly, the placement board 120 moves along with the door panel 130 and departs from the internal space of the casing 110, such that the placement board 120 becomes exposed. Further, the sliding block 310 drives the injection member 230 such that the injection member 230 moves upwards.

In some embodiments, when the food heating device 10 is not in use or is in a standby state, the sliding block 310 and the injection member 230 can be kept at a highest position, that is, the injection member 230 is in a state of not yet having entered the interior space of the casing 110.

Next, as shown in FIG. 5, in Step S20, the food item 20 carrying food to be heated can be placed on the exposed placement board 120, the hollow region 121 allows a lower portion of the food item 20 to pass through, and the frame 122 can support an upper outer edge portion of the food item 20.

Then, as shown in FIG. 6, in Step S30, the driving shaft 140 pulls the door panel 130 in a way that door panel 130 moves and approaches the front panel 12 until the door panel 130 comes into contact with the casing 110, such that the interior space of the casing 110 enters a closed state. Correspondingly, the placement board 120 moves along with the door panel 130 and enters the interior space of the casing 110, such that the placement board 120 enters a state of being enclosed in the casing 110.

Further, in Step S40, the sliding block 310 drives the injection member 230 such that the injection member 230 moves downwards. The injection member 230 passes through the fixing base 340 and the casing 110, and is further inserted into the food item 20. For example, the top of the food item 20 is a sealing film, and the injection member 230 punctures the sealing film and enters the interior of the food item 20. At this point, the heating device 200 is activated in response to the control instruction, the steam portion 210 and the hot water portion 220 can simultaneously or sequentially generate steam and hot water and simultaneously or sequentially inject steam and hot water into the interior of the food item 20 through the injection member 230, so as to heat the food carried at the interior of the food item 20.

In some embodiments, during the process of the steam portion 210 and the hot water portion 220 simultaneously or sequentially injecting steam and hot water into the interior of the food item 20, the sliding block 310 moves up and down in response to the control instruction. Thus, the injection member 230 also correspondingly moves up and down during the process of injecting the steam and hot water, thereby more uniformly dispersing the steam, hot water, or hot water and steam in the food item 20.

As shown in FIG. 2 to FIG. 6, in this embodiment, the placement device 100 further includes a bottom panel 150. The bottom panel 150 is fixed in the casing 110, and includes a plurality of slot openings 151. During the process of the steam portion 210 and the hot water portion 220 injecting steam and hot water into the food item 20 through the injection member 230, water possibly overflowing from the food item 20 is discharged and flown out of the casing 110 through the slot openings 151 of the bottom panel 150 and a corresponding channel.

As shown in FIG. 2 to FIG. 6, in this embodiment, the food heating device 10 further includes an air extraction device 400. The air extraction device 400 includes an air extraction channel 410, and is provided on the casing 110. The air extraction channel 410 of the air extraction device 400 is in communication with the interior of the casing 110.

Accordingly, during the heating process, the air extraction device 400 can draw out excessive steam to prevent condensate from condensing at the top of the casing 110.

Figure 8:
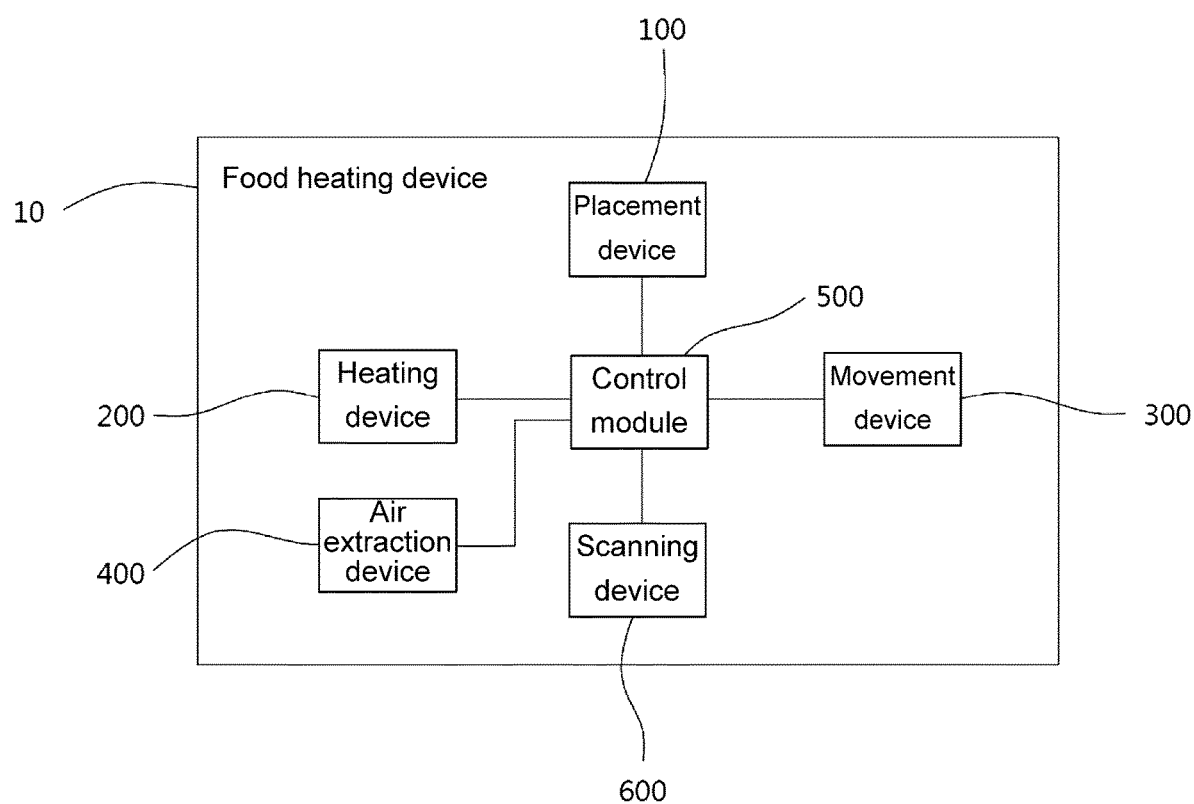
FIG. 8 is a block diagram of a food heating device according to one embodiment of the present invention.

Referring to FIG. 8, FIG. 8 shows a block diagram of the food heating device 10 according to one embodiment of the present invention. In this embodiment, the food heating device 10 further includes a control module 500 and a scanning device 600. The control module 500 is signally connected to the placement device 100, the heating device 200, the movement device 300, the air extraction device 400 and the scanning device 600. The control module 500 can receive a control instruction, and correspondingly control the operations of the placement device 100, the heating device 200, the movement device 300 and the air extraction device 400. Further, for example but not limited to, the scanning device 600 can be used configured to read information associated with the food item 200, and the control module 500 can correspondingly control the steam portion 210 and the hot water portion 220 of the heating device 200 according to the heating information described above.

For example, the food item 20 can be provided with a two-dimensional code. The two-dimensional code includes heating information of the food to be heated in the food item 20, and the heating information is, for example, injection time points, duration and temperature ranges of steam and hot water. For example, the scanning device 600 is an optical reader provided on the front panel 12, and the user can align the two-dimensional code on the food item 20 with the scanning device 600 for the scanning device 600 to read and analyze related information included in the two-dimensional code. In addition, the control module 500 sets and controls operations of corresponding components according to the related information of two-dimensional code.

In conclusion, the food heating device according to the embodiments of the present invention, by heating food to be heated by steam and hot water, is suitable for more types of foods to be heated and capable of enhancing heating efficiency without involving manual effort in a heating process. Regardless of whether food to be heated is food such as noodles or thick soup, the food heating device can quickly heat the food to be heated by steam and hot water, thus significantly enhancing convenience.

Although the technical content of the present invention is disclosed by way of preferred embodiments as above, it is to be understood that the scope of the present invention is not limited thereto. Slight modifications and variations made without departing from the spirit of the present invention by a person skilled in the art are encompassed within the scope of the present invention, and therefore the purview of protection of the present invention is to be accorded with the appended claims.

While preferred embodiments of the present invention have been shown and described herein, it will be obvious to those skilled in the art that such embodiments are provided by way of example only and can be implemented in combinations. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

I claim:

1. A food heating device, comprising:
   a placement device, comprising a casing, a placement board, and a bottom panel, the placement board being disposed in the casing and configured to place a food item, the bottom panel being fixedly disposed in the casing and including a plurality of slot openings;
   a channel arranged correspondingly to the slot openings;
   a heating device, comprising a steam portion, a heated water portion and an injection member, wherein the steam portion and the heated water portion are in communication with the injection member, the injection member passes through the casing and is movably provided corresponding to the placement board, the injection member is capable of moving up and down relative to the placement board in the casing, the steam portion and the heated water portion are capable of injecting steam and heated water simultaneously or sequentially through the injection member into the food item on the placement board so as to heat the food item, the slot openings of the bottom panel and the channel are capable of discharging any overflowing water from the food item; and
   a movement device, comprising a sliding block and a sliding shaft, the sliding block being movably provided on the sliding shaft;
   wherein the injection member is connected to the sliding block, when the sliding block moves up and down along the sliding shaft, the sliding block drives the injection member to together move up and down.

2. The food heating device according to claim 1, wherein the movement device further comprises a clamping member, and the clamping member is fixed on the sliding block and clamps the injection member.

3. The food heating device according to claim 2, wherein the movement device further comprises a fixing base, the fixing base is fixed on the casing, and the injection member movably passes through the fixing base and the casing.

4. The food heating device according to claim 1, wherein the placement device further comprises a door panel and a driving shaft, and the driving shaft is connected to the panel and is configured to move the door panel.

5. The food heating device according to claim 4, wherein the placement board is fixed on the door panel, and the driving shaft is configured to move the door panel to drive the placement board to move out of or move into the casing.

6. The food heating device according to claim 4, wherein the placement board comprises a hollow region and a frame, the frame encircles the hollow region, the hollow region is configured to allow the food item to pass through, and the frame is configured to support the food item.

7. The food heating device according to claim 4, further comprising:
   an air extraction device, provided on the casing and being in communication with an interior of the casing.

8. The food heating device according to claim 1, further comprising:
   a control module and a scanning device, the control module being signally connected to the scanning device and the heating device, and the scanning device being configured to read information associated with the food item.

9. A food heating method, comprising steps of:
   moving out a placement board from a casing of a placement device such that the placement board is exposed;
   placing a food item on the placement board being exposed;
   moving back the placement board into the casing such that the placement board is enclosed;

using a movement device, comprising a sliding block and a sliding shaft, the sliding block being movably provided on the sliding shaft;

injecting steam by a steam portion and injecting heated water by a heated water portion simultaneously or sequentially into the food item on the placement board through an injection member of a heating device so as to heat the food item, wherein the steam portion and the heated water portion are in communication with the injection member, the injection member is capable of moving up and down relative to the placement board in the casing, the injection member is connected to the sliding block, when the sliding block moves up and down along the sliding shaft, the sliding block drives the injection member to together move up and down, and the injection member passes through the casing and is movably provided corresponding to the placement board, and discharging heated water overflowing from the food item through a plurality of slot openings and a corresponding channel.

10. The food heating method according to claim 9, further comprising, prior to the step of injecting steam and hot water, a step of:

reading heating information associated with the food item by a scanning device signally connected to a control module being configured to control the steam portion and the hot water portion of the heating device according to the heating information.

11. The food heating method according to claim 10, wherein the heating information comprises injection time points, duration, temperature ranges of steam and hot water, or a combination thereof.

12. The food heating method according to claim 9, wherein the step of injecting steam and hot water further comprises a step of: moving up and down the injection member to disperse steam, hot water, or a combination thereof more uniform in the food item.

* * * * *